(12) United States Patent
Theodore et al.

(10) Patent No.: US 7,708,332 B2
(45) Date of Patent: May 4, 2010

(54) CONVERTIBLE ROOF SYSTEM

(75) Inventors: Chris P. Theodore, Birmingham, MI (US); Todd Schartner, Flat Rock, MI (US); Arthur L. MacNee, Southgate, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 281 days.

(21) Appl. No.: 11/972,324

(22) Filed: Jan. 10, 2008

(65) Prior Publication Data
US 2008/0191513 A1    Aug. 14, 2008

Related U.S. Application Data

(60) Provisional application No. 60/880,225, filed on Jan. 12, 2007.

(51) Int. Cl.
*B60J 7/08* (2006.01)
(52) U.S. Cl. .................. 296/107.01; 296/117
(58) Field of Classification Search ................ 296/107, 296/108, 116, 117, 136, 146.14
See application file for complete search history.

(56) References Cited

U.S. PATENT DOCUMENTS

| | | | |
|---|---|---|---|
| 2,704,225 A | 3/1955 | Anschuetz et al. | |
| 2,939,742 A | 6/1960 | Dardarian et al. | |
| 5,775,766 A | 7/1998 | Schaible et al. | |
| 5,785,375 A | 7/1998 | Alexander et al. | |
| 5,823,606 A | 10/1998 | Schenk et al. | |
| 6,293,605 B2 | 9/2001 | Neubrand | |
| 6,652,017 B2 | 11/2003 | Wagner et al. | |
| 6,739,645 B2 | 5/2004 | Papendorf et al. | |
| 6,799,788 B2 | 10/2004 | Plesternings | |
| 7,032,952 B2 | 4/2006 | Dilluvio | |
| 2002/0105205 A1 | 8/2002 | Willard | |
| 2004/0222658 A1 | 11/2004 | Dilluvio | |
| 2006/0249978 A1 | 11/2006 | Rosler et al. | |

FOREIGN PATENT DOCUMENTS

| | | |
|---|---|---|
| DE | 198 46 006 | 4/2000 |
| DE | 199 32 500 | 2/2001 |
| DE | 100 59 342 | 6/2002 |
| DE | 101 49 456 | 4/2003 |
| EP | 0 835 778 | 4/1998 |

*Primary Examiner*—Lori L Lyjak
(74) *Attorney, Agent, or Firm*—Harness, Dickey & Pierce, P.L.C.

(57) ABSTRACT

A convertible roof system employs a convertible roof assembly and a cover assembly which operably covers at least a portion of a vehicular area within which the convertible roof is stowed. In a further aspect of the present invention, the cover assembly includes a dual-acting deck lid. Another aspect of the present invention employs a movable main pivot bracket for the convertible roof assembly. Furthermore, an additional aspect of the present invention allows a stowed and collapsed convertible roof assembly to at least partially move with a stowage area cover when the cover is opened to allow rearward access into the stowage area.

36 Claims, 6 Drawing Sheets

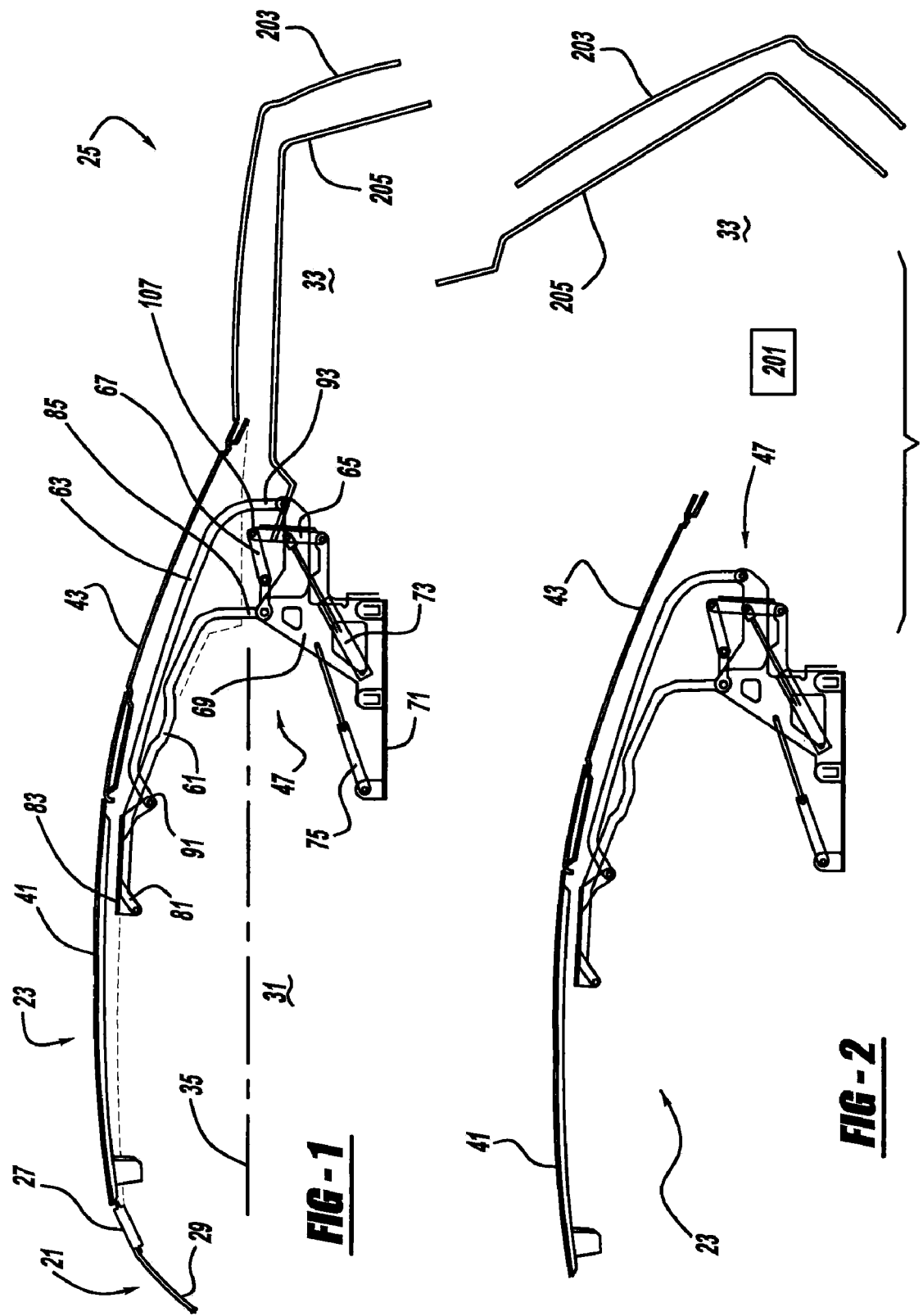

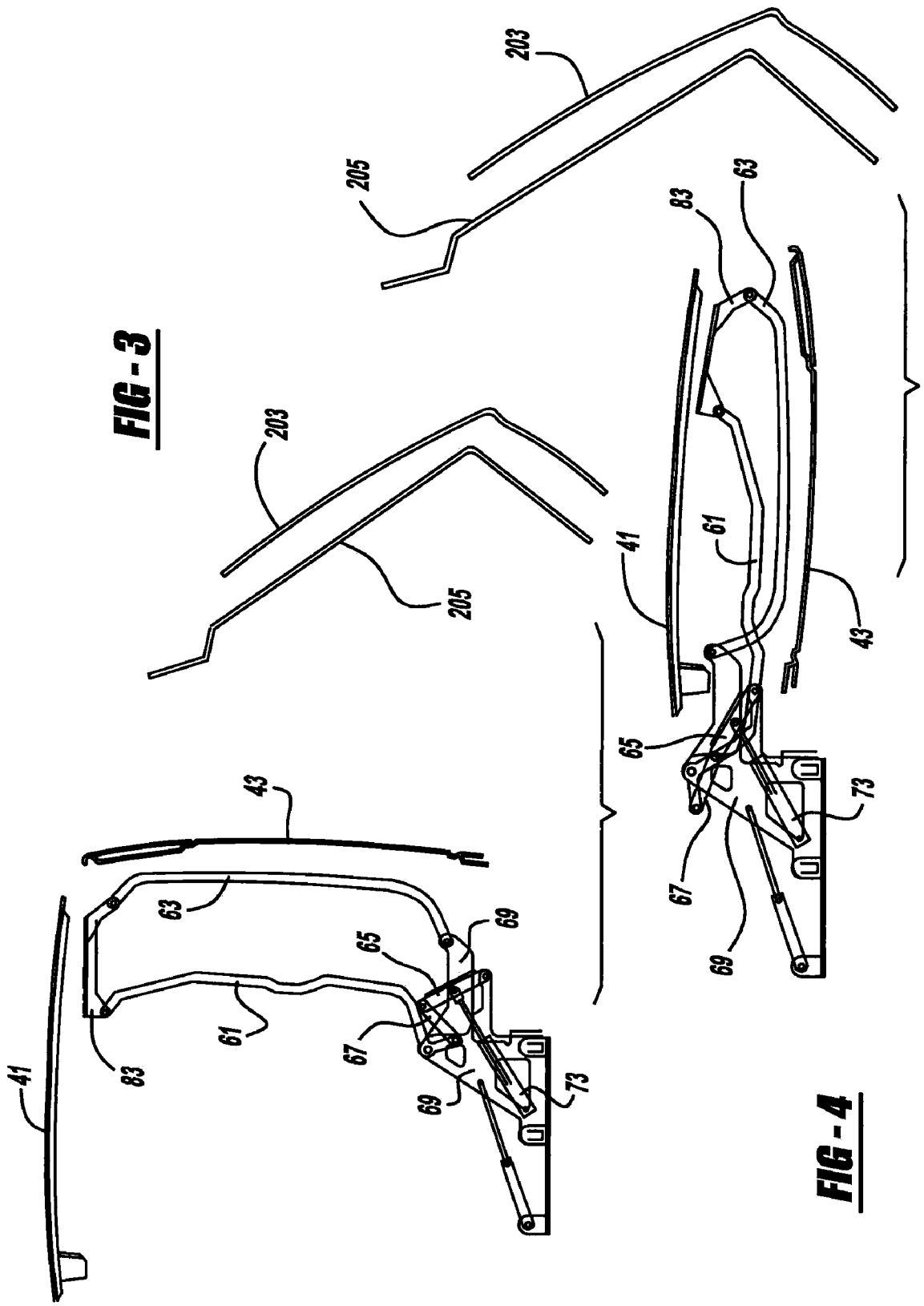

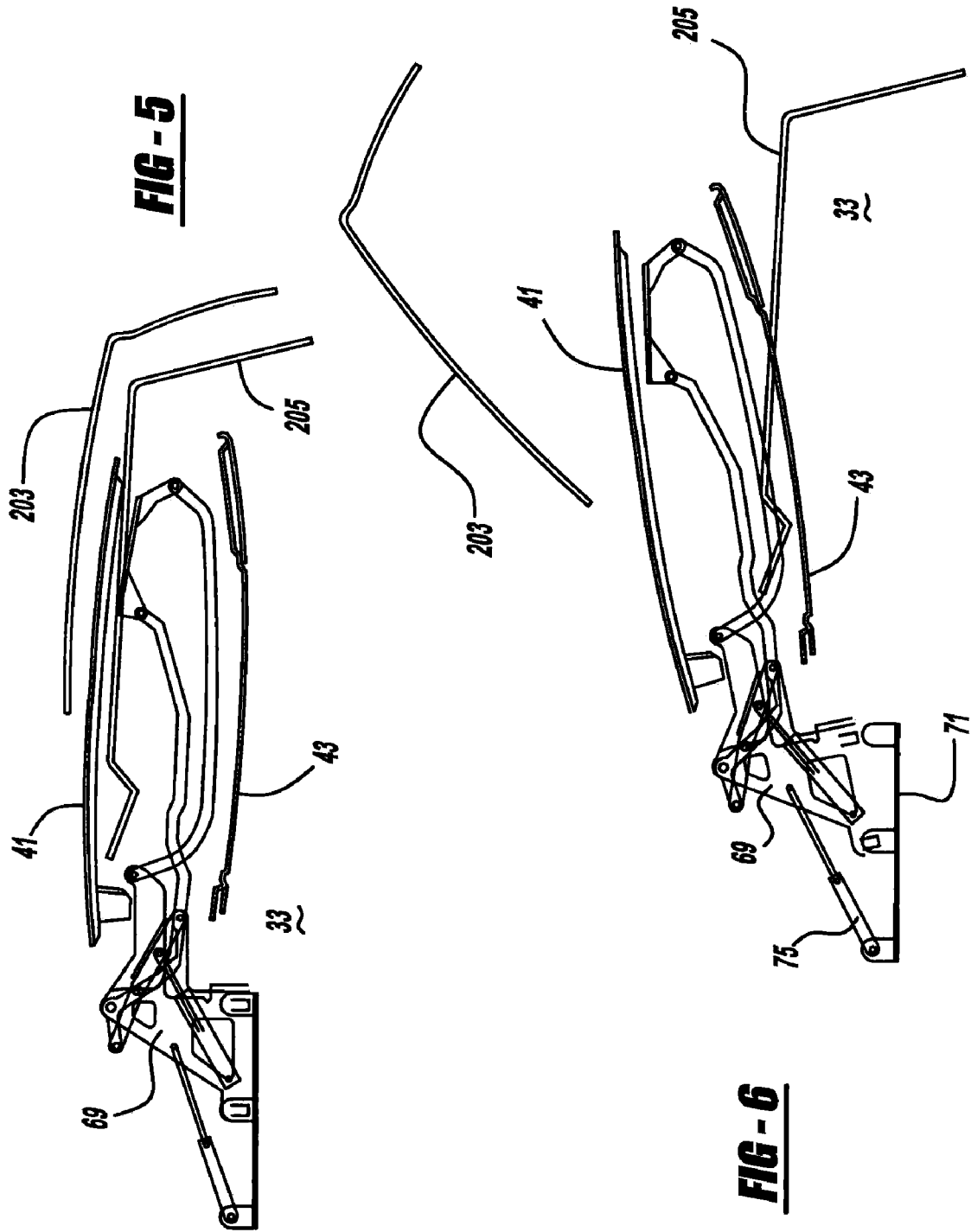

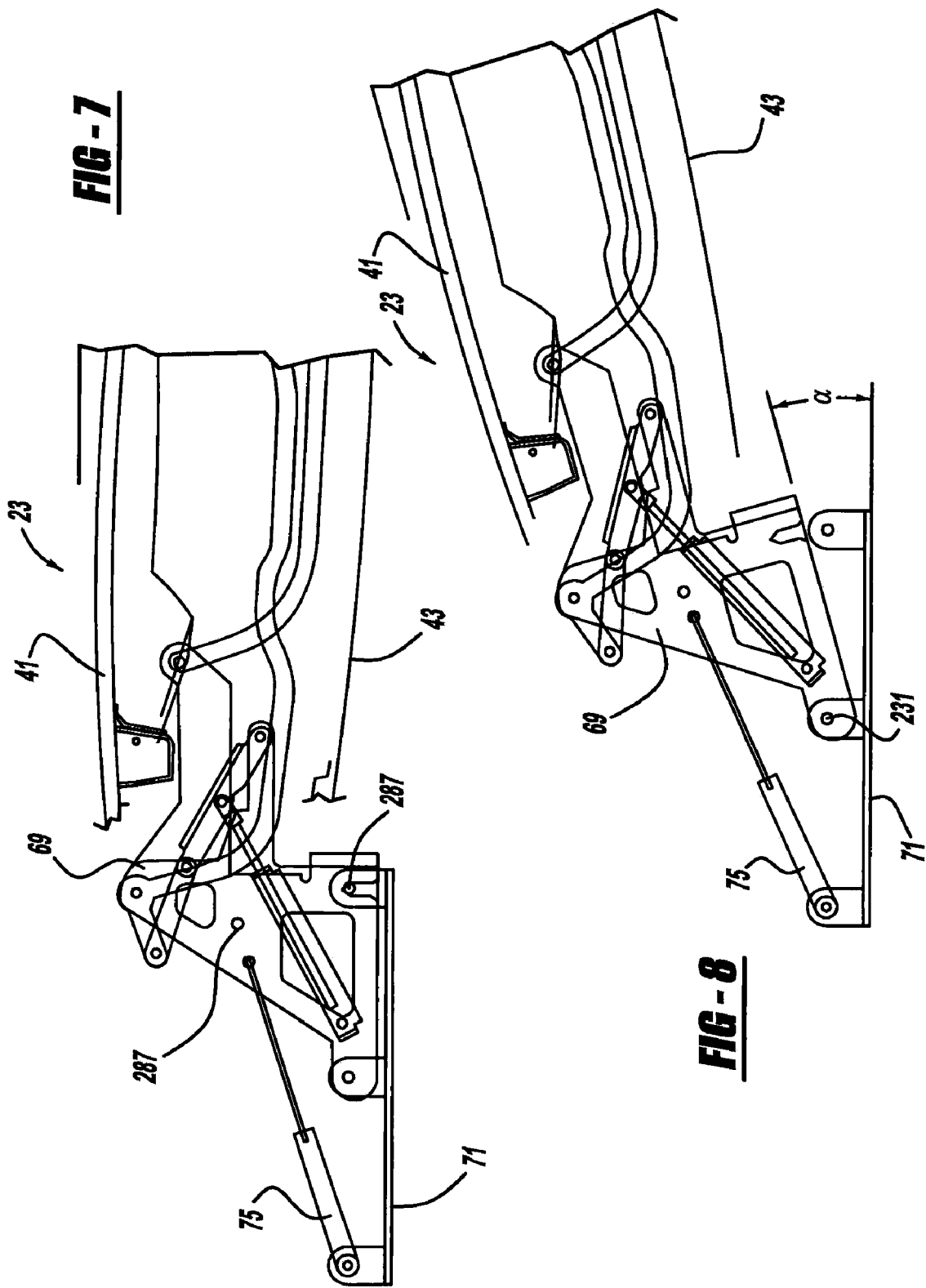

CONVERTIBLE ROOF SYSTEM

CROSS-REFERENCE TO RELATED APPLICATIONS

This application claims the benefit of U.S. Provisional Application No. 60/880,225, filed on Jan. 12, 2007. The disclosure of the above application is incorporated herein by reference.

FIELD

The present invention relates generally to a convertible roof system and more particularly to an automotive vehicle having convertible roof and deck lid assemblies.

BACKGROUND

The statements in this section merely provide background information related to the present disclosure and may not constitute prior art.

In some automotive vehicles, it is desirable to retract a convertible roof into a stowed position in a trunk. Traditionally, this has rendered the trunk unusable for miscellaneous article storage when the roof is stowed therein. Various recent attempts have been made to resolve this problem by employing dual-acting deck lids (also known as trunk lids). For example, reference should be made to the following U.S. patent Nos.: 2004/0222658 entitled "Retractable Roof Structural System" which published to Dilluvio on Nov. 11, 2004; U.S. Pat. No. 6,799,788 entitled "Decklid Mechanism for Vehicle with Retractable Top" which issued to Plesternings on Oct. 5, 2004; U.S. Pat. No. 5,823,606 entitled "Hard-Top Vehicle" which issued to Schenk et al. on Oct. 20, 1998; and U.S. Pat. No. 5,775,766 entitled "Convertible Hardtop Vehicle" which issued to Schaible et al. on Jul. 7, 1998; all of which are incorporated by reference herein. While some of these conventional constructions have improved the field, it is noteworthy that the deck lid movement is mechanically unrelated to the convertible roof top-stack movement and the stowed convertible roof may still be difficult to circumvent when a vehicle operator is trying to access the trunk.

SUMMARY

In accordance with the present invention, a convertible roof system employs a convertible roof assembly and a cover assembly which operably covers at least a portion of a vehicular area within which the convertible roof is stowed. In a further aspect of the present invention, the cover assembly includes a dual-acting deck lid. Another aspect of the present invention employs a movable main pivot bracket for the convertible roof assembly. Yet another aspect of the present invention provides either a retractable soft-top roof, a retractable hard-top roof or a combination thereof. Furthermore, an additional aspect of the present invention allows a stowed and collapsed convertible roof assembly to at least partially move with a stowage area cover when the cover is opened to allow rearward access into the stowage area. In still another aspect of the present invention, a movable locking device is operable to selectively allow or prevent movement of a roof pivot bracket. Moreover, a method of making and using a convertible roof system is also provided.

The convertible roof system of the present invention is advantageous over known devices in that the present invention provides for multi-functional movement mechanisms with at least some mechanical portions being shared and common for both retraction movement and movement to clear the stowage area for the convertible roof assembly. Such sharing of components simplifies modularization for easier manufacturing plant assembly, localizes mechanisms in order to reduce storage space encroachment, and achieves easier mechanical couplings between these traditionally separate mechanisms. The commonality and mechanical coupling of the movement mechanisms further ensures desired cooperation and coordination between the convertible roof assembly and the stowage area cover assembly which thereby reduces the risk of undesired collision between the roof and cover. The present invention advantageously provides greater stowage area access to the vehicle operator while maintaining a collapsed state of the roof.

Additional advantages and features of the present invention will become apparent from the following description and appended claims, taken in conjunction with the accompanying drawings. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 1-8 are diagrammatic side views showing the preferred embodiment of a convertible roof system of the present invention employed in various movement positions;

DETAILED DESCRIPTION

Figure 9:
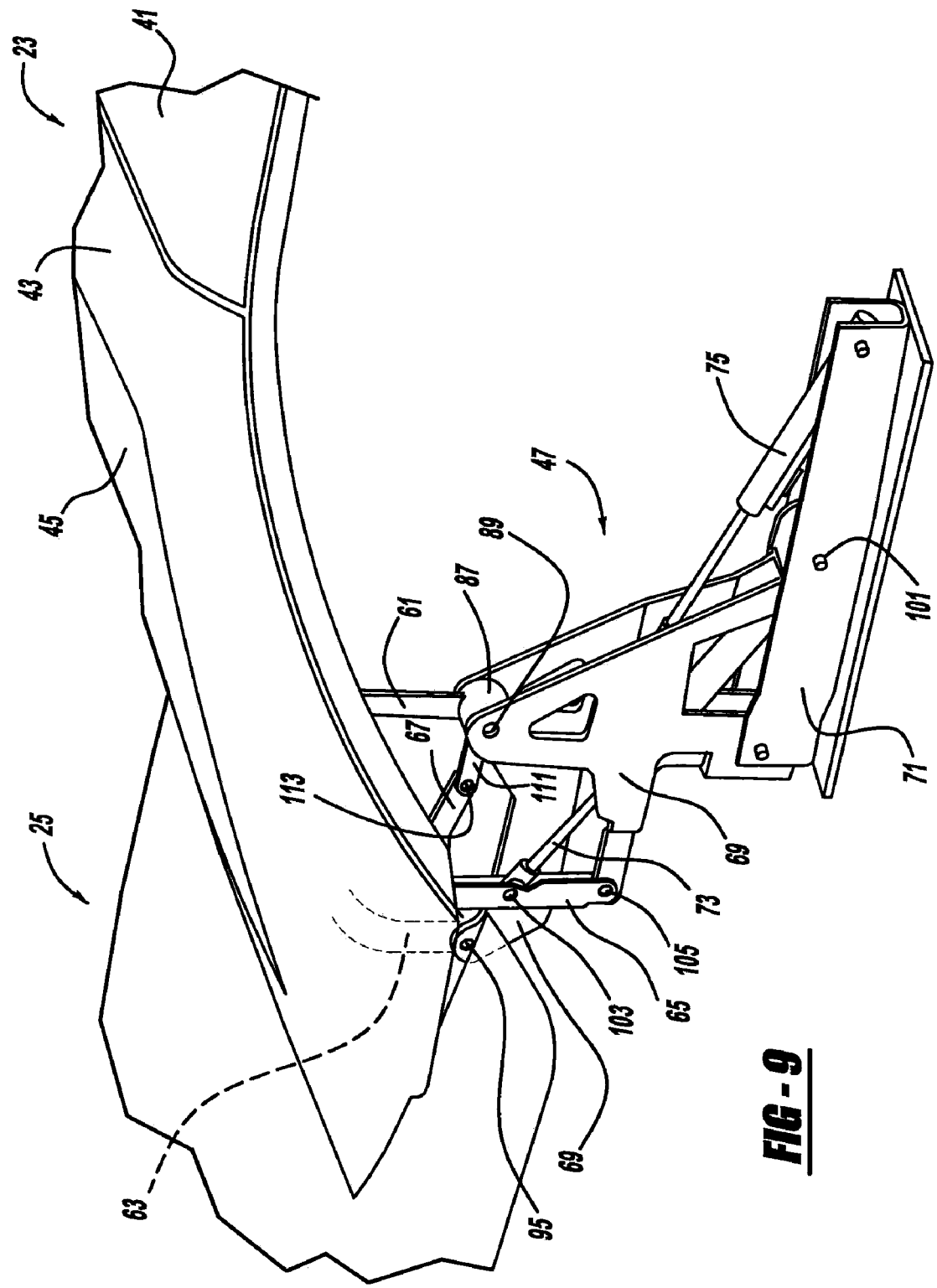
FIG. 9 is a perspective view, essentially opposite that of FIG. 1, showing the preferred embodiment of the convertible roof system, with a convertible roof assembly in a raised position and a decklid assembly in a closed position.

The following description is merely exemplary in nature and is not intended to limit the present disclosure, application, or uses. It should be understood that throughout the drawings, corresponding reference numerals indicate like or corresponding parts and features.

Referring to FIGS. 1 and 9, an automotive vehicle 21 employs a convertible roof assembly 23 and cover assembly, preferably a dual acting deck lid assembly 25. A body of automotive vehicle 21 includes stationary front header panels 27, a front windshield 29, a passenger compartment 31 and a roof stowage area or compartment, preferably a trunk 33. A reference line 35 indicates a belt-line of the vehicle.

Convertible roof assembly 23 includes a predominantly rigid, hard-top front roof 41 and a predominantly rigid, hard-top rear roof 43 movably coupled together by a hinge. Such a hinge is disclosed in U.S. Pat. No. 5,490,709 entitled "Hinge for a Folding Roof in a Convertible Automotive Vehicle" which issued to Rahn on Feb. 13, 1996, and is incorporated by reference herein. A rigid glass back window, also known as a backlite, 45 is mounted to and moves with rear roof 43. Furthermore, weatherstrips are mounted to roofs 41 and 43.

A top-stack mechanism 47, located on each side of the vehicle, operably raises and lowers roofs 41 and 43 between their fully raised positions shown in FIG. 1 to their fully retracted positions shown in FIG. 4. Each top-stack mechanism 47 includes an elongated primary link 61, an elongated supplemental link 63, a power link 65, a coupling drive link 67, a main pivot bracket 69, a mounting bracket 71, a topstack actuator 73 and a lift-assist actuator 75. Either of elongated links 61 or 63 may be considered a balance link. A distal end 81 of link 61 is pivotally coupled to a bracket 83 secured to a side rail of front roof 41. An opposite and proximal end 85 of link 61 has a generally cylindrically shaped bushing 87 which operably rotates about a main pivot 89 attached to an upper section of pivot bracket 69. A distal end 91 of link 63 is pivotally coupled to a rearward segment of bracket 83 attached to front roof 41. An opposite and proximal end 93 of link 63 is pivotally mounted to a rearwardly extending arm of pivot bracket 69 at pivot 95. Thus, a generally four-bar linkage arrangement is defined by the elongated links 61 and 63 as well as brackets 83 and 69. Top-stack actuator 73 preferably includes a hydraulic cylinder connected to a hydraulic pump and a programmable controller, such as a micro processor, which is automatically actuated in response to a vehicle occupant-actuated switch. The cylinder of actuator 73 is pivotally mounted to bracket 71 at pivot 101. A piston rod is extendable from the cylinder and is pivotally coupled to link 65 at pivot 103. A lower end of link 65 is pivotally coupled to a rearwardly extending second arm of pivot bracket 69 at pivot 105 and an upper end of link 65 is pivotally coupled to link 67 at pivot 107. An opposite and forward end of link 67 is pivotally coupled to a rearwardly facing leg 111 affixed to bushing 87 at pivot 113. Thus, top-stack actuator 73 is automatically actuated to retract its piston rod and thereby drive links 65 and 67 to cause rearward rotation of link 61, which in turn, causes retraction movement of roofs 41 and 43 as shown by comparing FIGS. 1-4. Reverse operation causes the roofs to be raised to their closed positions.

The electronic control unit automatically actuates a deck lid movement mechanism 201, shown in FIG. 2, to rotate and forwardly open a deck lid panel 203 and a selectively attached deck lid frame 205 about a rear pivot axis or multiple axes to allow front access into the trunk stowage area 33. This can best be observed by comparing FIGS. 1 and 2. Such a mechanism is disclosed in the previously mentioned U.S. Pat. Nos. 5,823,606 to Schenk et al. and 5,775,766 to Schaible et al. This deck lid and deck lid frame movement can be simultaneous with the roof retraction by employing potentiometers or other sensors, or the deck lid and frame may be fully opened prior to roof retraction. FIG. 4 shows the convertible roof assembly in its fully retracted position within trunk storage compartment 33 but with the deck lid 203 and deck lid frame 205 still in their fully raised and forwardly open positions. Subsequently, FIG. 5 illustrates deck lid 203 and deck lid frame 205 in their fully closed positions where deck lid 203 covers a rearward half of the fully retracted front roof 41. Accordingly, the forward half of the external surface of front roof 41 is visibly exposed when viewed from outside the vehicle and is generally flush with belt-line 35 (see FIG. 1) and the adjacent body panels, including deck lid panel 203. It is envisioned that in some vehicular constructions, the forward edge of deck lid 203 may have a generally C-shape when viewed from above such that forwardly extending side portions of the decklid either cover or are adjacent to side edges of front roof when the convertible roof assembly is fully retracted and the decklid is fully closed.

Referring now FIGS. 6 through 8, lift-assist actuator 75 is preferably an automatically actuated, hydraulic cylinder and piston rod, or alternately may be a manually driven fluid dampener-type device such as a pneumatic strut, which serves to control rotational movement of main pivot bracket 69 about a front pivot 231 attached to bracket 71. Bracket 71 is mounted to the vehicular body structure, such as a quarter inner panel, floor pan, trunk pan or the like. Upon release of a lock (which will be described in greater detail hereinafter), the rear of pivot bracket is operably raised through an angle α which will thereby cause the entire collapsed convertible roof assembly 23 to raise from the fully retracted position shown in FIG. 7 to an intermediate yet still collapsed orientation as shown in FIGS. 6 and 8. Hence, when deck lid 203 is rearwardly opened and pivoted about a forward pivot axis or axes, the collapsed convertible roof assembly is either automatically or manually lifted to allow the vehicle operator to access the miscellaneous storage space within trunk stowage area 33 below convertible roof assembly 23.

Figure 10:
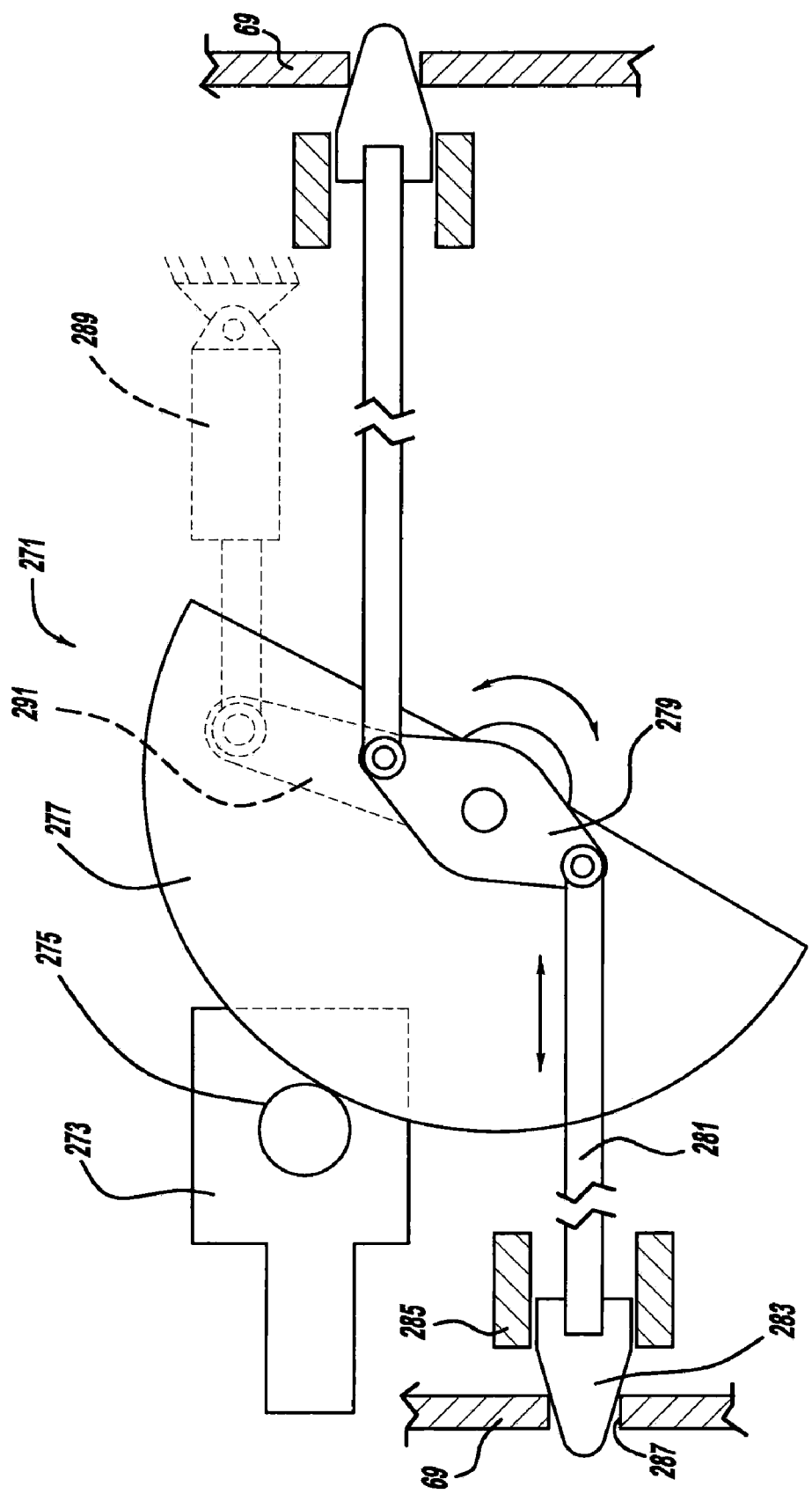
FIG. 10 is a diagrammatic rear view showing a bracket locking device employed with the preferred embodiment convertible roof system.

FIG. 10 illustrates a lock 271 employed to selectively allow movement of main pivot bracket 69 on each side of the vehicle. When the deck lid is automatically or manually opened to allow rear access to the trunk stowage area, the programmable controller will automatically energize an electromagnetic actuator, preferably an electric motor 273. At output gear 275 of electric motor 273 will then rotate a sector gear 277 enmeshed therewith. Sector gear 277 will accordingly rotate a coupled crank 279 which has a pair of rod members 281 or cable members coupled thereto for inserting or withdrawing pins 283. Pins 283 and/or members 281 are guided within channels of guide blocks 285 and pins 283 selectively move into and out of one of the apertures 287 (also see FIG. 7) in each main pivot bracket 79. Optionally, a hydraulic cylinder 289 can drive crank 291 in order to drive members 281 instead of electric motor 273 and sector gear 277.

It is noteworthy that the present invention provides one or more common pivot axes for both the deck lid and top-stack devices in combination with moving the convertible roof assembly out of the way for normal deck lid opening. The linkage mechanisms control the convertible roof to optimize positioning for the most efficient cargo area space and access. The method of manufacturing and operating the convertible roof assembly includes attaching the linkages and actuators as disclosed, and moving the roofs, stowage area cover and mechanisms as disclosed hereinabove. For example, the method includes moving a main pivot bracket of a convertible roof assembly relative to the vehicle, especially while the roof assembly remains fully collapsed. It is also envisioned that an object sensor would be employed in the trunk stowage area to prevent undesired stowed roof damage.

While the preferred embodiment of the convertible roof system has been disclosed, other variations of the convertible roof system can be employed. For example, the convertible roof assembly can use a fabric covered and pliable roof spanning over underlying roof bows and side rails; see for example, U.S. Pat. No. 7,032,952 entitled "Dual Acting Decklid" which issued to Dilluvio on Apr. 25, 2006, and is incorporated by reference herein. Furthermore, a retractable hard-top can alternately have three, four and five rigid roof panels coupled together and retracted into the roof stowage area. It is also envisioned that the roof stowage area can be a boot entirely forward of and separated from a trunk or rear engine compartment, and the cover may be a rigid tonneau cover, although various advantages of the present invention may not be realized. Alternately, a solenoid-actuated pin, locally positioned adjacent each pivot bracket, can be substituted in place of the central, crank operated lock. Moreover, other linkage constructions, numbers and shapes for the topstack mechanism and cover movement mechanism may be used, although various advantages of the present invention may not be realized. It is intended by the following claims to cover these and any other departures from the disclosed embodiments which fall within the true spirit of this invention.

What is claimed is:

1. A convertible roof system for an automotive vehicle, the convertible roof system comprising:
   a convertible roof extended in an open position and collapsed for positioning in a stowed position;
   a main body bracket;
   a pivot bracket rotatably coupled to the main body bracket;
   a first pivot rotatably coupling the convertible roof to the pivot bracket about which the convertible roof rotates between the open and stowed positions without motion of the pivot bracket with respect to the main body bracket; and
   a second pivot rotatably coupling the pivot bracket to the main body bracket, the second pivot allowing both the pivot bracket and the convertible roof while still collapsed to be rotated in unison to move the convertible roof partially away from the stowed position.

2. The convertible roof system of claim 1, further including at least first and second link members rotatably connecting the convertible roof to the pivot bracket.

3. The convertible roof system of claim 2, further including an actuator connected to the first link member and the pivot bracket, the actuator operable to move the first link member to position the convertible roof between the open and stowed positions.

4. The convertible roof system of claim 3, wherein the actuator comprises one of a hydraulic actuator and a pneumatic actuator, the actuator having a cylinder rotatably mounted at a first end to the pivot bracket.

5. The convertible roof system of claim 1, further including an actuator connected to the pivot bracket and the main body bracket, the actuator operable to rotate both the pivot bracket and the convertible roof in unison when the convertible roof is positioned in the stowed position.

6. The convertible roof system of claim 5, wherein the actuator comprises one of a hydraulic actuator and a pneumatic actuator, the actuator having a cylinder rotatably mounted at a first end to the main body bracket.

7. The convertible roof system of claim 1, further including a lock assembly operable to releasably retain the pivot bracket in a non-rotatable position with respect to the main body bracket, the lock assembly including:
   opposed guide blocks connected to the main body bracket; and
   a pin slidably disposed between the guide blocks and extendable into an aperture created in the pivot bracket to prevent rotation of the pivot bracket with respect to the main body bracket, and retractable out of the aperture to permit rotation of the pivot bracket.

8. The convertible roof system of claim 7, wherein the lock assembly further includes:
   a rod connected to the pin;
   a crank member connected to the rod opposite to the pin operable to displace the rod and the pin; and
   an actuator connected to the crank member operable to move the crank member and the rod for insertion and retraction of the pin.

9. The convertible roof system of claim 1, further including a lock mechanism operable to releasably retain the pivot bracket in a non-rotatable position with respect to the main body bracket, the lock mechanism including a solenoid driven pin extendable into an aperture created in the pivot bracket to prevent rotation of the pivot bracket with respect to the main body bracket, and retractable out of the aperture to permit rotation of the pivot bracket.

10. The convertible roof system of claim 1, wherein in the open position the convertible roof is positioned over a passenger compartment of the vehicle and in the stowed position the convertible roof is positioned within a roof stowage space of the vehicle.

11. A retractable roof assembly for an automotive vehicle, the automotive vehicle having a body within which is a passenger compartment and a roof stowage space outside of the passenger compartment, the retractable roof assembly comprising:
   a rigid first roof section disposed above the passenger compartment when in an extended position;
   a rigid second roof section disposed at least partially above the passenger compartment and behind the first roof section when in the extended position, the second roof section being rotatably coupled to the first roof section; and
   a mechanism coupling the second roof section to the body, the mechanism being operable to move the first and second roof sections to the extended position, and further operable to collapse the first and second roof sections to a retracted position having the first and second roof sections positioned substantially within the roof stowage space, the first roof section positioned above the second roof section and both the first and second roof sections being substantially horizontal when in the retracted position, the mechanism including:
   (a) a structure having a first pivot about which the first and second roof sections rotate between the extended and the retracted positions; and
   (b) a second pivot, the second pivot allowing both the structure and the first and second roof sections positioned in the retracted position to be rotated in unison to permit operator access to a portion of the roof stowage space.

12. The retractable roof assembly of claim 11, wherein the second pivot is operable to permit rotation of both the structure and the first and second roof sections toward the passenger compartment.

13. The retractable roof assembly of claim 11, wherein the second pivot is inoperable during rotation of the first and second roof sections between the extended and the retracted positions.

14. The retractable roof assembly of claim 11, wherein the roof stowage space comprises a trunk located rearward of the passenger compartment.

15. The retractable roof assembly of claim 11, wherein the mechanism includes at least one pneumatic actuator operable to rotate the first and second roof sections about the first pivot.

16. The retractable roof assembly of claim 11, wherein the mechanism includes at least one hydraulic actuator operable to rotate the first and second roof sections about the first pivot.

17. A retractable roof assembly for an automotive vehicle, the automotive vehicle having a body within which is a passenger compartment and a roof stowage space outside of the passenger compartment, the retractable roof assembly comprising:
   at least two roof sections disposed above the passenger compartment when in an extended position;
   a mechanism coupling a rear one of the roof sections to the body, the mechanism operable to extend the roof sections to the extended position, and further operable to collapse the roof sections to a retracted position having the roof sections positioned substantially within the roof stowage space, the mechanism including:

a first member coupled to the vehicle body;

a second member rotatably coupled to the first member having a first pivot about which the roof sections rotate between the extended and retracted positions; and a second pivot rotatably coupling the second member to the first member, the second pivot allowing both the second member and the roof sections positioned in the retracted position to be rotated in unison to permit operator access to a portion of the roof stowage space; and a deck lid connected to the vehicle body and operable to at least partially cover the roof stowage space in a closed position, the deck lid movable rearwardly with respect to the passenger compartment to permit insertion of the roof sections in the roof stowage space, and movable forwardly to permit rotation of the second member and the roof sections.

18. The retractable hard-top roof assembly of claim 17, wherein proximate ones of the at least two roof sections are rotatably coupled to each other using a hinge device.

19. The retractable hard-top roof assembly of claim 18, wherein the at least two roof sections include a first forward roof section and a second rear roof section.

20. The retractable hard-top roof assembly of claim 17, wherein the at least two roof sections include a first forward roof section and a second rear roof section and further including a top-stack mechanism located on opposing sides of the automotive vehicle operable to extend and retract the first and second roof sections.

21. The retractable hard-top roof assembly of claim 20, wherein the top-stack mechanism includes an elongated primary link pivotally coupled to the first member and an elongated supplemental link pivotally coupled between the first member and the front roof section.

22. The retractable hard-top roof assembly of claim 20, wherein the top-stack mechanism further includes:

a power link connected to the rear roof section; and an actuator connected to the power link and the first member operable to rotate the front and rear roof sections.

23. The retractable hard-top roof assembly of claim 20, wherein the top-stack mechanism further includes a coupling drive link connected between the rear roof section and the second member.

24. The retractable hard-top roof assembly of claim 17, wherein the roof sections are positioned in a vertical stacked configuration and oriented substantially horizontal when in the retracted position.

25. A retractable roof assembly for an automotive vehicle, the retractable roof assembly comprising:

a convertible roof extended in an open position and collapsed for positioning in a retracted position, the convertible roof having a front roof section and a rear roof section;

a retracting mechanism coupled to the rear roof section, the retracting mechanism being operable to extend and collapse the convertible roof, the front and rear roof sections both being substantially horizontal with the front roof section positioned above the rear roof section when in the retracted position, the retracting mechanism including:

a main body bracket;

a pivot bracket rotatably coupled to the main body bracket;

a first pivot rotatably coupling the convertible roof to the pivot bracket about which the convertible roof moves between the open and retracted positions without motion of the pivot bracket with respect to the main body bracket; and a second pivot rotatably coupling the pivot bracket to the main body bracket, the second pivot allowing both the pivot bracket and the convertible roof while still collapsed to be rotated in unison to move the convertible roof partially away from the retracted position.

26. The retractable roof assembly of claim 25, further comprising:

a hinge mechanically coupling the front roof section proximate to a rearward edge of the front roof section to the rear roof section proximate to a forward edge of the rear roof section;

the front roof section having an outside surface and an inside surface; and the rear roof section having an outside surface and an inside surface;

wherein the inside surface of the front roof section is foldable to face the inside surface of the rear roof section in a clamshell manner.

27. The retractable roof assembly of claim 26, wherein the front roof section is retractable on top of the rear roof section such that the outer surface of the front roof section partially covers the rear roof section whereby a forward portion of the outside surface of the front roof section is partially visibly exposed when viewed from outside the vehicle.

28. The retractable roof assembly of claim 25, further comprising a backlite mounted to and moveable with the rear roof section.

29. The retractable roof assembly of claim 25, further comprising:

a deck lid panel connected to the automobile vehicle body and operating to cover a rearward half of the front roof section when in a panel closed position; and a deck lid movement mechanism operating to rotate the deck lid panel about a rear pivot axis to permit entry of the front and rear roof sections into a trunk space.

30. A method for manufacturing a convertible roof for an automotive vehicle, the method comprising:

fixedly connecting a first bracket to a body of the vehicle;

rotatably coupling the convertible roof to a second bracket using a first pivot;

rotatably joining the second bracket to the first bracket using a second pivot;

connecting a first actuator between the convertible roof and the first bracket operable to rotate the convertible roof about the first pivot from an extended to a retracted position without motion of the second bracket with respect to the first bracket; and engaging a second actuator between the first and second brackets operable to rotate both the second bracket and the convertible roof positioned in the retracted position in unison about the second pivot to move the convertible roof partially out of a roof stowage space to permit a vehicle operator access to the roof stowage space.

31. The method of claim 30, further comprising rotatably joining a first roof section to a second roof section to create the convertible roof.

32. The method of claim 31, wherein the coupling step includes rotatably coupling the second roof section to the body.

33. The method of claim 31, further comprising positioning the first roof section above the second roof section and orienting both the first and second roof sections substantially horizontal when in the retracted position.

34. The method of claim 30, further comprising limiting the rotation of the second actuator to a predetermined angle.

35. The method of claim 30, further comprising releasing a lock prior to operation of the second actuator.

36. The method of claim 30, further comprising connecting a deck lid operable to cover the roof stowage space for displacement and pivoting the deck lid about a forward pivot axis prior to operation of the second actuator.

* * * * *